United States Patent
Gordon

(10) Patent No.: US 9,661,049 B2
(45) Date of Patent: *May 23, 2017

(54) SYSTEMS AND METHODS OF PROVIDING INTERSPERSED MANIFEST FILE SPECIFICATIONS FOR ADAPTIVE STREAMING VIDEO

(71) Applicant: DLVR, Inc., Tempe, AZ (US)

(72) Inventor: Michael Gordon, Paradise Valley, AZ (US)

(73) Assignee: DLVR, INC., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/215,889

(22) Filed: Jul. 21, 2016

(65) Prior Publication Data
US 2016/0330261 A1  Nov. 10, 2016

Related U.S. Application Data

(63) Continuation of application No. 14/709,171, filed on May 11, 2015, now Pat. No. 9,426,089.
(Continued)

(51) Int. Cl.
*G06F 15/173* (2006.01)
*H04L 29/06* (2006.01)
(Continued)

(52) U.S. Cl.
CPC ............. *H04L 65/60* (2013.01); *H04L 47/62* (2013.01); *H04L 47/783* (2013.01);
(Continued)

(58) Field of Classification Search
CPC ... H04L 45/28; H04L 65/4084; H04L 65/607; H04N 21/231
(Continued)

(56) References Cited

U.S. PATENT DOCUMENTS 8,051,166 B1   11/2011   Jenkins et al.
8,145,782 B2   3/2012    McGowan et al.
(Continued)

FOREIGN PATENT DOCUMENTS

| WO | 2013147983 | 10/2013 |
|---|---|---|
| WO | 2016069896 | 5/2016 |
| WO | 2016069896 | 7/2016 |

OTHER PUBLICATIONS

PCT/US2015/058054, "International Search Report and Written Opinion", Apr. 28, 2016, 24 pages.
(Continued)

*Primary Examiner* — Dustin Nguyen
(74) *Attorney, Agent, or Firm* — Kilpatrick, Townsend & Stockton, LLP

(57) ABSTRACT

Techniques for serving a manifest file of an adaptive streaming video include receiving a request for the manifest file from a user device. The video is encoded at different reference bitrates and each encoded reference bitrate is divided into segments to generate video segment files. The manifest file includes an ordered list of universal resource locators (URLs) that reference a set of video segment files encoded at a particular reference bitrate. A source manifest file that indicates the set of video segment files is identified based on the request. An issued manifest file that includes a first URL and a second URL is generated based on the source manifest file. The first URL references a first domain and the second URL references a second domain that is different from the first domain. The issued manifest file is transmitted to the user device as a response to the request.

20 Claims, 7 Drawing Sheets

Related U.S. Application Data

(60) Provisional application No. 62/072,265, filed on Oct. 29, 2014.

(51) Int. Cl.
  *H04L 12/911* (2013.01)
  *H04L 12/863* (2013.01)
  *H04L 29/08* (2006.01)
  *H04N 21/234* (2011.01)
  *H04N 21/858* (2011.01)

(52) U.S. Cl.
  CPC ........ *H04L 65/4084* (2013.01); *H04L 65/608* (2013.01); *H04L 65/80* (2013.01); *H04L 67/02* (2013.01); *H04L 67/06* (2013.01); *H04L 67/1076* (2013.01); *H04N 21/234* (2013.01); *H04N 21/8586* (2013.01)

(58) Field of Classification Search
  USPC .................................................. 709/203, 206
  See application file for complete search history.

(56) References Cited

U.S. PATENT DOCUMENTS

| | | |
|---|---|---|
| 8,234,350 B1 | 7/2012 | Gu et al. |
| 8,327,013 B2 | 12/2012 | McGowan et al. |
| 8,495,675 B1 | 7/2013 | Philpott et al. |
| 8,539,523 B2 | 9/2013 | Philpott et al. |
| 8,645,504 B2 | 2/2014 | McGowan |
| 8,762,564 B1 | 6/2014 | Philpott et al. |
| 2004/0210320 A1 | 10/2004 | Pandya |
| 2012/0151009 A1 | 6/2012 | Bouazizi et al. |
| 2012/0198492 A1 | 8/2012 | Dhruv et al. |
| 2013/0103849 A1 | 4/2013 | Gillies et al. |
| 2013/0290465 A1 | 10/2013 | Harrison et al. |
| 2013/0332971 A1 | 12/2013 | Fisher et al. |
| 2014/0089465 A1 | 3/2014 | van Brandenburg et al. |
| 2014/0149557 A1 | 5/2014 | Lohmar |
| 2014/0230003 A1 | 8/2014 | Ma et al. |
| 2014/0250230 A1 | 9/2014 | Brueck et al. |
| 2014/0280906 A1 | 9/2014 | Johns et al. |
| 2014/0337411 A1 | 11/2014 | Panje et al. |
| 2015/0180924 A1 | 6/2015 | O'Callaghan |
| 2015/0256577 A1 | 9/2015 | Gutiérrez et al. |
| 2015/0296274 A1 | 10/2015 | Good et al. |
| 2016/0127260 A1 | 5/2016 | Gordon |
| 2016/0127440 A1 | 5/2016 | Gordon |

OTHER PUBLICATIONS

U.S. Appl. No. 14/709,171 , "Final Office Action", Feb. 25, 2016, 14 pages.
U.S. Appl. No. 14/709,171 , "Notice of Allowance", May 24, 2016, 8 pages.
U.S. Appl. No. 14/925,693 , "First Action Interview Office Action Summary", Apr. 11, 2016, 5 pages.
U.S. Appl. No. 14/925,693 , "First Action Interview Pilot Program Pre-Interview Commu", Feb. 25, 2016, 4 pages.

First Variant Manifest File 500 (200 kbps)

502 — http://sfs.b.manifestserver.net/XYZ789/contentprovider/firstmanifestfile/200/segment-1.ts
504 — http://contentprovider.service-provider.net/firstmanifestfile/200/segment-2.ts
506 — http://contentprovider.service-provider.net/firstmanifestfile/200/segment-3.ts
508 — http://contentprovider.service-provider.net/firstmanifestfile/200/segment-4.ts
510 — http://sfs.b.manifestserver.net/XYZ789/contentprovider/firstmanifestfile/200/segment-5.ts
512 — http://contentprovider.service-provider.net/firstmanifestfile/200/segment-6.ts
514 — http://contentprovider.service-provider.net/firstmanifestfile/200/segment-7.ts
516 — http://contentprovider.service-provider.net/firstmanifestfile/200/segment-8.ts
518 — http://sfs.b.manifestserver.net/XYZ789/contentprovider/firstmanifestfile/200/segment-9.ts
520 — http://contentprovider.service-provider.net/firstmanifestfile/200/segment-10.ts
522 — http://contentprovider.service-provider.net/firstmanifestfile/200/segment-11.ts
524 — http://contentprovider.service-provider.net/firstmanifestfile/200/segment-12.ts Second Issued Variant Manifest File 550 (600 kbps)

552 — http://sfs.b.manifestserver.net/XYZ789/contentprovider/firstmanifestfile/600/segment-1.ts
554 — http://contentprovider.service-provider.net/firstmanifestfile/600/segment-2.ts
556 — http://contentprovider.service-provider.net/firstmanifestfile/600/segment-3.ts
558 — http://contentprovider.service-provider.net/firstmanifestfile/600/segment-4.ts
560 — http://sfs.b.manifestserver.net/XYZ789/contentprovider/firstmanifestfile/600/segment-5.ts
562 — http://contentprovider.service-provider.net/firstmanifestfile/600/segment-6.ts
564 — http://contentprovider.service-provider.net/firstmanifestfile/600/segment-7.ts
566 — http://contentprovider.service-provider.net/firstmanifestfile/600/segment-8.ts
568 — http://sfs.b.manifestserver.net/XYZ789/contentprovider/firstmanifestfile/600/segment-9.ts
570 — http://contentprovider.service-provider.net/firstmanifestfile/600/segment-10.ts
572 — http://contentprovider.service-provider.net/firstmanifestfile/600/segment-11.ts
574 — http://sfs.b.manifestserver.net/XYZ789/contentprovider/firstmanifestfile/600/segment-12.ts

FIG. 5

SYSTEMS AND METHODS OF PROVIDING INTERSPERSED MANIFEST FILE SPECIFICATIONS FOR ADAPTIVE STREAMING VIDEO

CROSS-REFERENCES TO RELATED APPLICATIONS

This application is a continuation of U.S. patent application Ser. No. 14/709,171, filed May 11, 2015, entitled "SYSTEMS AND METHODS FOR SESSION-BASED RESOURCE ASSIGNMENT, DELIVERY, PERFORMANCE MANAGEMENT AND MEASUREMENT IN A NETWORKED ENVIRONMENT," which claims the benefit of U.S. Provisional Patent Application No. 62/072,265, filed Oct. 29, 2014, entitled "SYSTEMS AND METHODS FOR SESSION-BASED RESOURCE ASSIGNMENT, DELIVERY, PERFORMANCE MANAGEMENT AND MEASUREMENT IN A NETWORKED ENVIRONMENT," the entire disclosures of which are hereby incorporated by reference for all purposes.

BACKGROUND

1. The Field of the Invention

The present invention generally relates to adaptive streaming video. More specifically, the present invention relates to performance measurement and management for delivery of video content using adaptive streaming video protocols.

2. The Relevant Technology

Adaptive bitrate streaming can improve a user's experience when streaming multimedia content, such as video, over a data network or telecommunications network. To enable adaptive streaming of a video file, typically the video is encoded into multiple separate files, sometimes referred to as renditions or variants, each of which represents the same video encoded at a different reference bitrate. These files are then divided into segments in a consistent manner across the related group of files, with each segment typically (but not necessarily) a few seconds to several seconds in duration, e.g., the first segment of each variant file comprising the first ten seconds of the video, the second segment of each variant file comprising the second ten seconds, etc. Note that while this time-based segmentation is consistent across the bitrate files, it is not necessary that each sequential segment be the same duration; for example, the first segment of each bitrate can be ten seconds in duration, the second segment of each bitrate can be five seconds in duration, and the third segment of each bitrate can be six seconds in duration, and so on. Then, during playback of the video, the video player downloads the video segment file by segment file and can shift between different reference encoding bitrates as it proceeds from one segment to another, if necessary and depending on the rate at which segment files are downloaded to the device and other performance considerations, which can be affected by network conditions, server performance, device performance or characteristics, and/or other technical issues. For example, to maintain continuous playback, the player can downshift to a lower reference encoding bitrate when the network is congested and throughput is reduced; later, if network performance improves and throughput increases, the player can upshift to a higher reference encoding bitrate. Note that although playback is not interrupted, the user's experience can still be affected since a downshift in reference bitrate can cause a variation in video quality that is noticeable to the user, and since a lower bitrate video file may have reduced definition and other visual characteristics.

Generally, video file encoding can be performed in a consistent manner or in a variable manner. When a video file is encoded in a consistent manner, the encoded bit rate of the video is consistent during the video; accordingly, when a consistently encoded video is divided into segments, each segment of a given duration will be a comparable size file to other segments of the same duration. When a video file is encoded in a variable manner, the encoded bit rate of the video may vary during the video, for example when greater motion in a given sequence of video frames results in a higher bitrate in order to preserve the visual consistency of that sequence compared to other portions of the video; accordingly, when a variably encoded video is divided into segments, a segment of a given duration may be a different file size, larger or smaller, compared to one or more other segments of the same duration. Not all adaptive streaming video specifications and/or implementations support, or work properly with, variably encoded video files, but some may.

Typically, in order to obtain the video segment files for playback the video player first requests a master manifest file, sometimes also called an index file or a playlist, by issuing an HTTP GET request for the master manifest Uniform Resource Locator (URL). The master manifest is typically a text file comprising a plurality of URLs, each of which identifies a variant manifest; these URLs can be absolute or relative URLs, and are commonly relative URLs. The video player then requests some or all of the variant manifest files by issuing HTTP Get requests for the URLs of the required variant manifests. The video player may also issue HTTP header requests for the URLs of some or all of the variant manifests that are not requested in full (if any); this enables the video player to confirm that a manifest file is available for later download, and to obtain information about the file contained in the header. Each variant manifest is typically a text file comprising a plurality of URLs, each of which identifies a video segment file; these URLs can also be absolute or relative URLs, and are commonly relative URLs. Manifest files can contain other information in addition to URLs, for example metadata and other descriptive or control information. In the case of live video, as the video player proceeds through playback of the segments identified in the then-current variant manifest, it will request an updated variant manifest, which should contain additional video segment URLs; in normal operation, updated variant manifest files will continue to be requested by, and available to, the video player until a manifest file is reached that contains an endlist tag or comparable indicator that the video stream has reached its end.

BRIEF SUMMARY

In one embodiment, a system for serving a manifest file of an adaptive streaming video is presented. The system includes a manifest file server coupled to a network. The manifest file server is configured to receive a request for one or more manifest files of adaptive streaming video sent by a video player or video playback device. The adaptive streaming video is encoded at a plurality of reference bitrates and each of the encoded reference bitrates is divided into a plurality of segments to generate a plurality of video segment files. A manifest file served by the manifest file server includes a plurality of universal resource locators (URLs)

that reference a set of video segment files that are encoded at a particular reference bitrate for the adaptive streaming video.

The manifest file server is further configured to identify, when necessary, a source manifest file based on the request. The source manifest file for a requested manifest file comprises a set of video segment file URLs that reference segment files that are encoded at the particular reference bitrate for the adaptive streaming video and that in total comprise a given video or the currently available portion of a given video. An issued manifest file is generated based on the source manifest file. The issued manifest file includes a first URL and a second URL. The first URL references a first video segment file from the set of video segment files and the second URL references a second video segment file from the set of video segment files. The first video segment file referenced by the first URL is hosted within a first domain and the second video segment file referenced by the second URL is hosted within a second domain that is different from the first domain. The issued manifest file is transmitted to the user device as a response to the request.

In another embodiment, a method for serving a manifest file of an adaptive streaming video is presented. The method includes receiving a request for the manifest file of the adaptive streaming video from a user device. The adaptive streaming video is encoded at a plurality of reference bitrates and each of the encoded reference bitrates is divided into a plurality of segments to generate a plurality of video segment files. The manifest file includes a plurality of universal resource locators (URLs) that reference a set of video segment files that are encoded at a particular reference bitrate for the adaptive streaming video.

The method further includes identifying a source manifest file based on the request. The source manifest file indicates the set of video segment files that are encoded at the particular reference bitrate for the adaptive streaming video. Additionally, the method includes generating an issued manifest file based on the source manifest file. The issued manifest file includes a first URL and a second URL. The first URL references a first video segment file from the set of video segment files and the second URL references a second video segment file from the set of video segment files. The first video segment file referenced by the first URL is hosted within a first domain and the second video segment file referenced by the second URL is hosted within a second domain that is different from the first domain. The method also includes transmitting the issued manifest file to the user device as a response to the request.

In a further embodiment, a non-transitory computer-readable medium is presented. The non-transitory computer-readable medium has instructions stored therein, which when executed cause a computer to perform a set of operations including receiving a request for a manifest file of an adaptive streaming video from a user device. The adaptive streaming video is encoded at a plurality of reference bitrates and each of the encoded reference bitrates is divided into a plurality of segments to generate a plurality of video segment files. The manifest file includes a plurality of universal resource locators (URLs) that reference a set of video segment files that are encoded at a particular reference bitrate for the adaptive streaming video.

The set of operations further includes identifying a source manifest file based on the request. The source manifest file indicates the set of video segment files that are encoded at the particular reference bitrate for the adaptive streaming video. An issued manifest file is generated based on the source manifest file. The issued manifest file includes a first URL and a second URL. The first URL references a first video segment file from the set of video segment files and the second URL references a second video segment file from the set of video segment files. The first video segment file referenced by the first URL is hosted within a first domain and the second video segment file referenced by the second URL is hosted within a second domain that is different from the first domain. The issued manifest file is transmitted to the user device as a response to the request.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 is an illustration of exemplary issued variant manifest files that are generated for an adaptive streaming video.

DETAILED DESCRIPTION OF THE INVENTION

Figure 1:
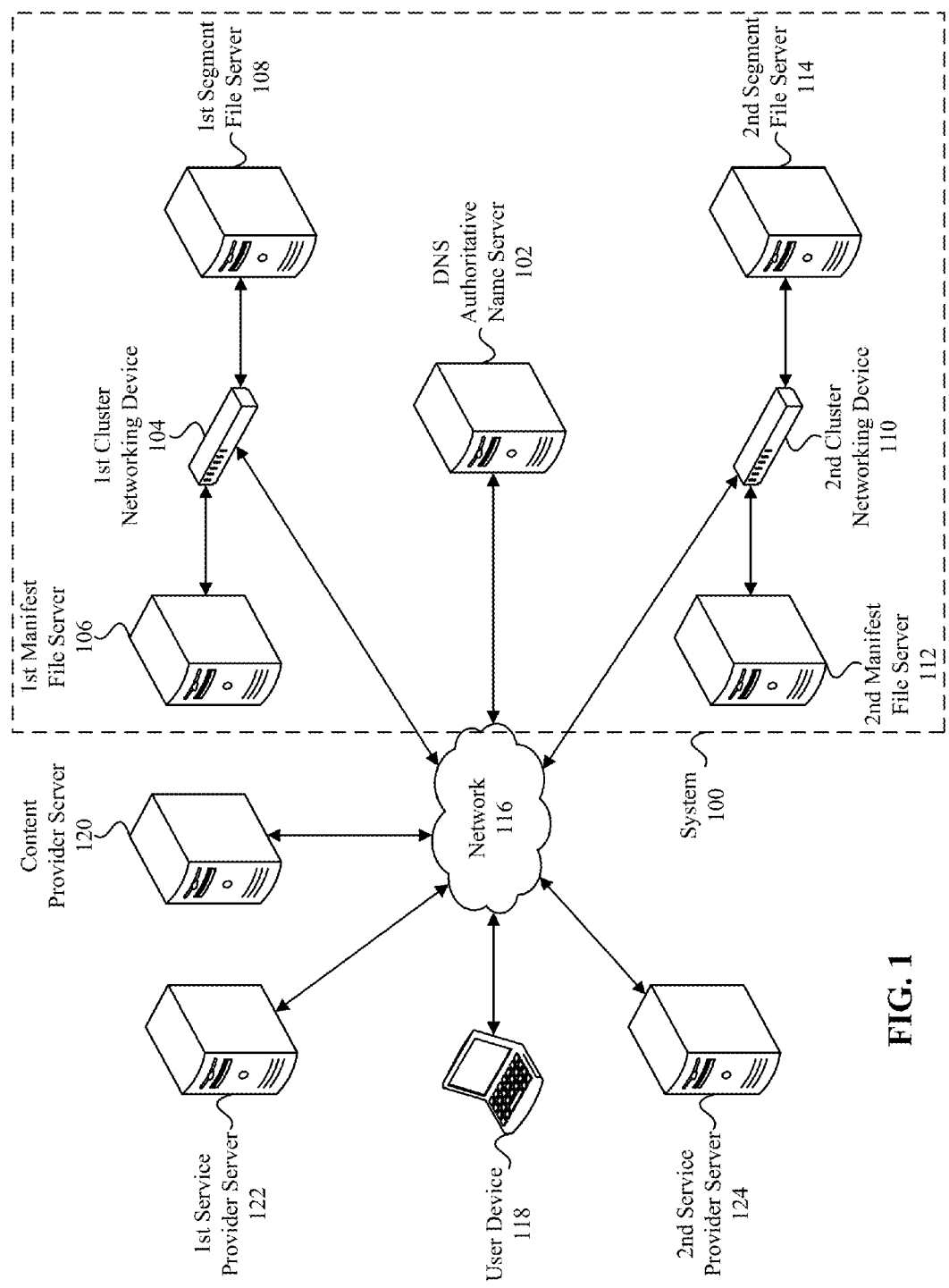
FIG. 1 is an illustration of an exemplary environment for implementing one embodiment of a system for measuring and managing the performance of adaptive streaming video deliveries.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims. Further, when a particular feature, structure, or characteristic is described in connection with an embodiment, it is submitted that it is within the knowledge of one skilled in the art to affect such feature, structure, or characteristic in connection with other embodiments whether or not explicitly described.

Streaming refers to a process of presenting multimedia content as the content is being delivered over a telecommunications network, rather than waiting for the entire content to be delivered before presenting the content. While video and audio are the most popular forms of streaming media, other forms of media can also be streamed, including text, image, and other data. Streaming offers several advantages over other delivery methods, such as immediate presentation of the content without having to wait for the entire content to download. However, streaming also has its limitations. One of the major drawbacks of streaming is that the quality of a user's experience is highly dependent on network performance and bandwidth. For example, in the case of video streaming, if the video data cannot be delivered to the user's device at a transmission rate that is faster than the rate at which the video data is rendered, playback of the video will freeze and the user's experience of the video will be interrupted.

To improve user experience, a content provider that is distributing multimedia content will often utilize one or more service providers, such as a cloud computing service provider or a content delivery network (CDN), to distribute the content. The service provider can use a variety of techniques to improve delivery performance and content availability. For example, CDNs, such as Akamai Technologies and Limelight Networks, provide content delivery services by maintaining a large number of servers that are distributed across multiple locations. When a request for the content is received, the request is directed to servers that are located close to the requesting point (in network terms) and are well-performing (typically, not under severe load conditions).

Further complicating the technical environment, content providers typically allocate the distribution of content among two or more service providers for redundancy purposes, allowing distribution to continue if one service provider suffers an outage. Additionally, content data for a streaming session can be supplied from different content providers. For example, in the case of editorial content combined with advertising content, the content provider for the editorial content can be a publisher and the content provider for the advertising content can be an advertising server or service provider. It is common for each content provider and service provider to utilize a separate, independently managed technical infrastructure and network for delivery of their respective content data.

One service provider may perform better in one situation while another service provider may perform better in a different situation. Technical conditions that can affect content delivery performance include, for example, the user device that is requesting the content, the access network to which the user device is connected, the type of access network (such as mobile or broadband), intermediate networks, the service provider network or other infrastructure servicing the delivery of the content, the geographic location of the user device, and the type and size of the content. The performance of a particular service provider can also change over time, fluctuate regularly or irregularly, and be significantly impacted by unusual occurrences, such as sudden changes in demand, outages, equipment failures, and security breaches. When multiple service providers are involved in distributing or supplying content, variations in performance from a single service provider can have a significant impact on user experience. However, service provider performance is difficult to determine accurately, fairly, and comprehensively. Service provider performance is also difficult to monitor in actual use (as opposed to by synthetic testing, for example using a probe or other testing point that does not measure the actual user content session), and is especially difficult to determine from a user's perspective. Without performance measurements and monitoring, it can be difficult to identify when a service provider is causing performance issues and the technical conditions under which user experience is affected, especially within a timeframe that allows for effective action.

Embodiments described herein relate to systems and methods for measuring and managing the performance of streaming content deliveries in a networked environment. The embodiments do not require the installation of additional software or software extensions on a user device, and thus are not limited by the software environments of user devices. Some embodiments utilize adaptive streaming video delivery protocols that are designed to work efficiently over large distributed Hypertext Transfer Protocol (HTTP) networks such as the Internet. Examples of adaptive streaming video delivery protocols include Apple's HTTP Live Streaming (HLS) protocol, Adobe's HTTP Dynamic Streaming (HDS) protocol, Dynamic Adaptive Streaming over HTTP (DASH) developed under the Moving Picture Experts Group (MPEG) working group, and other similar protocols. Examples and embodiments provided herein are described in the context of the Apple HLS protocol. However, it is understood that the systems and methods described in the embodiments can be implemented using any appropriate adaptive streaming video delivery protocol.

To enable adaptive streaming, the video content is encoded into digital files at multiple bitrates. For example, the video content can be encoded in a consistent manner into four digital files, one at 200 kilobits per second (kbps), one at 400 kbps, one at 600 kbps, and one at 800 kbps. The video content can also be encoded in a variable manner into different digital files, such that the bitrate varies at different times of the video for a particular file, and at a particular time of the video, each file will have a different bitrate. Thus, the term "reference bitrate" is used herein to denote the relative difference in bitrate between different files, rather than the specific bitrate of the video. Furthermore, although the examples and embodiments provided herein are described in the context of video content that is encoded in a consistent manner, it is understand that embodiments can also be implemented using video content that is encoded in a variable manner.

After the video content is encoded into different reference bitrate files, each file is divided into small, sequential segments that are typically multi-seconds in duration (e.g., each segment might be 10 seconds long). The segments are typically separate files or separate byte ranges within a file and can be requested and/or delivered individually. All encoded reference bitrate files for a particular video content are segmented consistently, at least in terms of time, such that the $n^{th}$ segment of each encoded reference bitrate file represents the same time portion of the video content (e.g., the first segment of each encoded reference bitrate file represents the first 10 seconds of the video). It is noted that while in practice today encoding into multiple bitrates is performed first and segmentations is performed second, the order in which encoding and segmentation are performed can be reversed, with the video first being segmented into time-based segments and then each segment being encoded at multiple bitrates.

When a user device makes a request for the video content, one or more manifest files (also known as index files or playlists) are transmitted to the user device. A manifest file is addressed by a uniform resource locator (URL) and can include URLs that reference other manifest files or video segment files, along with metadata (control and descriptive information). As used herein, "master" manifest file refers to a manifest file that includes URLs that reference other manifest files, and "variant" manifest file refers to a manifest file that includes URLs that reference video segment files. A master manifest file is transmitted to the user device in response to the initial request for the video content. The URLs in the master manifest file reference the variant manifest files and the user device can use these URLs to request the variant manifest files. The URLs in a variant manifest file reference video segment files that are encoded at a particular reference bitrate.

The video player on the user device uses the URLs in a variant manifest file to request video segment files sequentially, starting with a given bitrate. The video player can then shift from one bitrate to another depending on performance characteristics measured from segment data packets arriving at the user device. Shifting occurs at predetermined points, referred to as keyframes, which are consistent among all bitrates. This ensures that when a shift in bitrate occurs, there is no shift in timing of the displayed video content. However, the user can still notice a change in video quality as a result of the bitrate shift.

FIG. 1 is an illustration of an exemplary environment for implementing one embodiment of a system 100 for measuring and managing the performance of adaptive streaming video deliveries. System 100 includes Domain Name System (DNS) authoritative name server 102, first cluster networking device 104, first manifest file server 106, first segment file server 108, second cluster networking device 110, second manifest file server 112, and second segment file server 114. First cluster networking device 104, first manifest file server 106, and first segment file server 108 form a first cluster while second cluster networking device 110, second manifest file server 112, and second segment file server 114 form a second cluster. The components within a given cluster are located together and each cluster is located at a diverse network location to increase performance and availability. In other embodiments, there can be no DNS authoritative name server or more than one DNS authoritative name servers. Furthermore, there can be any number of clusters, with any number of manifest file servers and segment file servers at each cluster.

The components of system 100 are coupled either directly or indirectly (via another component) to network 116. For example, in this embodiment, DNS authoritative name server 102 is coupled directly to network 116 and first manifest file server 106 is coupled indirectly to network 116 via first cluster networking device 104. Networking devices 104 and 110 can be, for example, routers, switches, or gateways. Network 116 can be a public network, a private network, or a combination of public and private. Network 116 can include a local area network (LAN), a wide area network (WAN), a wired network, a wireless network, a telephone network, such as a cellphone network, the Internet, the World Wide Web, or any other desired network. Network 116 can use any desired communication and/or network protocols.

Each component of system 100 is identified by one or more hostnames specific to that component. Optionally, a unique hostname can be assigned to each group of a given component type, with increasing levels of specificity until individual components are identified. This can be useful in implementations that include a large number of components deployed in multiple distributed clusters with multiple components at each cluster. For example, manifestserver.net can be the hostname that addresses all manifest file servers of system 100, a.manifestserver.net can be the hostname that addresses all manifest file servers at cluster A, and 1.a.manifestserver.net can be the hostname that addresses manifest file server number 1 at cluster A. In these examples, net is the top-level domain of the hostnames, manifestserver is the second-level domain of the hostnames, while a and 1.a are subdomains of the respective hostnames.

DNS authoritative name server 102 is a DNS name server that is authoritative for resolving the hostnames of system 100. DNS authoritative name server 102 receives requests to resolve hostnames that identify a component, a group of components, or the network of components of system 100. A hostname is resolved into one or more Internet Protocol (IP) addresses that are assigned to the component or components identified by the hostname and the IP addresses are transmitted back in response to a request.

There are also components coupled to network 116 that are not a part of system 100, including user device 118, content provider server 120, first service provider server 122, and second service provider server 124. Content provider server 120 is managed and operated by a content provider that wishes to distribute an adaptive streaming video. Content provider server 120 can be, for example, a web server that hosts a website for the content provider. First service provider server 122 is managed and operated by a first service provider that is distributing the video for the content provider and second service provider server 124 is managed and operated by a second service provider. To distribute the video, the content provider publishes a URL for a manifest file of the video on the website. After the URL is published, a user can utilize user device 118 to visit the website and view the video. When the user navigates to the website, the published URL is transmitted from content provider server 120 to user device 118. User device 118 can then request the manifest file of the video using the published URL. To assign a particular delivery to a service provider, the content provider publishes a URL that contains a hostname that references, directly or indirectly (such as through the use of a CNAME), the assigned service provider, rather than its own website, and the user device 118 then requests the manifest file of the video from the service provider.

Each URL can be an absolute URL or a relative URL. An absolute URL includes a host field and a path field for identifying a resource that is referenced by the URL. The host field contains either an IP address or a hostname that identifies the server hosting the resource and the path identifies the resource. For example, the URL www.example.com/page.html can identify a server that is associated with the hostname www.example.com. This URL also indicates that the server is within the domain example.com, and www identifies a subdomain within this domain; alternatively, in the case of a CNAME implementation the server is within another domain for which www.example.com is an alias. More specifically, com identifies the top level domain and example identifies the second level domain. A relative URL does not include a host field. Rather, the parser (e.g., the browser if the URL references a web page or a video player if the URL references video content) assumes that the resource is hosted by the same server from which the URL is received. For example, a resource located at www.example.com/logo.gif can be identified in the HTML for the web page www.example.com/page.html using the relative URL /logo.gif. Although examples and embodiments described herein use absolute URLs for the sake of clarity, it is understood that embodiments can also be implemented using relative URLs for at least some URLs.

The host field of the published URL for the manifest file of the video contains a hostname that is associated, either directly or indirectly, with the network of manifest file servers of system 100. For example, http://contentprovider. manifestserver.net/firstmanifestfile.m3u8 can be the published URL for the manifest file firstmanifestfile.m3u8, which is also the path of the URL. In this example, the host field of the URL contains the hostname contentprovider. manifestserver.net. The character string contentprovider is unique to the content provider and is used to identify the content provider. Thus, contentprovider is a subdomain that is created within the domain manifestserver.net to designate the content provider. In other embodiments, the character string designating the content provider can be included in the path portion of the URL (e.g., http://manifestserver.net/contentprovider/firstmanifestfile.m3u8).

It should be noted that, typically, the content provider will also provide a URL for requesting a source manifest file. As used herein, a source manifest file is a manifest file that is obtained from the content provider or a service provider that is distributing the content for the content provider. In contrast, a manifest file returned to a user device 118 by a manifest file server of system 100 will be referred to as an issued manifest file. The manifest file servers of system 100 generate the issued manifest file based on the source manifest file. If a manifest file server does not have the source manifest file, or a current (unexpired) version of the source manifest file, the manifest file server will use the URL to request the source manifest file. Thus, the URL for the source manifest file is different from the published URL. For example, the URL for requesting the source manifest file might be http://manifestfiles.contentprovider.com/firstmanifestfile.m3u8. The hostname contained in the host field of this URL is within the domain contentprovider.com, while the hostname contained in the host field of the published URL is within the domain manifestserver.net.

In some embodiments, the character string designating the content provider in the published URL can also be the hostname contained in the URL for the source manifest file. For example, http://manifestserver.net/manifestfiles.contentprovider.com/firstmanifestfile.m3u8 can be a published URL that includes the character string manifestfiles.contentprovider.com in the URL path to designate the content provider. This can be useful because, when a manifest file server receives a request for the published URL, all of the character strings necessary to compose the URL for the source manifest file are included in the request. The manifest file server can then request the source manifest file, if needed, without having to perform a lookup to determine the URL for the source manifest file. Note that in some embodiments, an authentication lookup or other authentication mechanism may still be required to confirm that the referenced content provider is authorized to direct manifest file requests to the manifest file server or other components of system 100.

In other embodiments, the hostname in the host field of the published URL is indirectly associated with the network of manifest file servers. For example, a CNAME record can be used to associate an alias hostname with the canonical hostname for the network of manifest file servers. An example of a published URL using an alias hostname might be http://alias.contentprovider.com/firstmanifestfile.m3u8. When a DNS resolution is performed for alias.contentprovider.com by DNS name servers that are authoritative for that hostname (which are typically operated by the content provider or a DNS service provider), a CNAME record containing the canonical hostname (e.g., contentprovider. manifestserver.net) in the data field is returned. A new DNS request for resolution of the canonical hostname can then be made to obtain the IP addresses of the manifest filer servers. This can be useful because, if the published URL is visible to a user, the published URL appears to refer to a server of the content provider, rather than a server of system 100. Furthermore, this allows the content provider to quickly and easily change the destination host of the published URLs without having to change all of the published URLs. For example, the content provider can simply change the canonical hostname in the CNAME record.

To retrieve the manifest file that is referenced by the published URL, user device 118 makes a request to resolve the hostname that is contained in the host field of the published URL. The request is transmitted to the local name server of user device 118. However, since the hostname is associated with the manifest file servers of system 100, the request will eventually reach DNS authoritative name server 102 for processing. DNS authoritative name server 102 resolves the hostname into IP addresses for one or more manifest file servers, or one or more manifest file server clusters.

In some embodiments, when resolving the hostname, DNS authoritative name server 102 selects manifest file servers or clusters based on a number of factors in order to improve performance, and returns IP addresses for the selected servers or clusters. Example factors that selection can be based on include: network latency or performance between the manifest file server or cluster and another computing device, server, or network (e.g., user device 118, the local name server for user device 118, the access network of user device 118, a server that is hosting source manifest files, a content provider server, or a service provider server); geographic location of the manifest file server or cluster; geographic location of another computing device, server, or network; availability and utilization (both current and anticipated) of the manifest file server or cluster; whether the manifest file server or cluster has previously processed requests for the manifest file; the type of content associated with the manifest file; the content provider; and the user device type or user agent that is requesting the resolution. In other embodiments, the hostname is resolved using less complicated techniques, such as round-robin DNS resolution.

After the hostname is resolved into one or more IP addresses, DNS authoritative name server 102 transmits the IP address(es) to user device 118. User device 118 can then send a request for the manifest file to a server identified by the one or more IP addresses. For example, if the hostname is resolved into an IP address for first manifest file server 106, user device 118 will send the request for the manifest file to first manifest file server 106. To process the request, first manifest file server 106 generates an issued manifest file and transmits the issued manifest file to user device 118 in response to the request. The issued manifest file is generated to enable performance measurements and management. Additional details for generating the issued manifest file are provided herein below with reference to FIG. 4.

Figure 2:
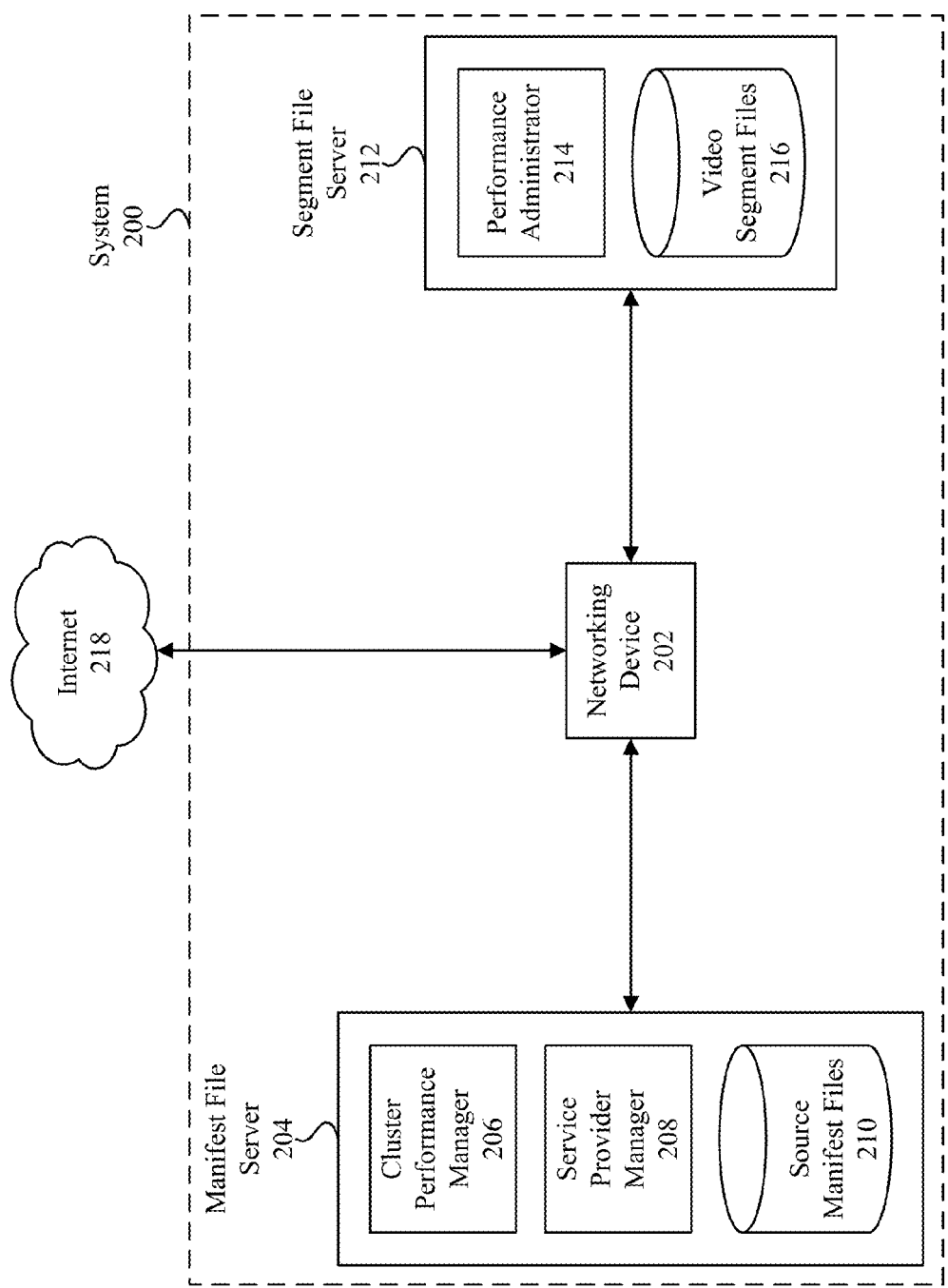
FIG. 2 is a block diagram of one embodiment of a system for measuring and managing the performance of adaptive streaming video deliveries.

FIG. 2 is a block diagram of one embodiment of a system 200 for measuring and managing the performance of adaptive streaming video deliveries. System 200 includes networking device 202, manifest file server 204, and segment file server 212. Manifest file server 204 and segment file server 212 are connected to the Internet 218 via networking device 202. Only one server of each type is illustrated in this figure for the sake of clarity. However, it is understood that system 200 can include any number of servers arranged into any number of clusters.

Manifest file server 204 further includes cluster performance manager 206, service provider manager 208, and source manifest files 210. Manifest file server 204 handles requests for master manifest files and variant manifest files. To process a request, manifest file server 204 generates an issued manifest file and transmits the issued manifest file to the requesting user device.

Cluster performance manager 206 selects the hostnames of servers or clusters of system 200 for URLs included in the issued manifest file. For example, to generate an issued master manifest file, manifest file server 204 configures URLs that reference variant manifest files. For each URL, cluster performance manager 206 selects a manifest file server or cluster to handle the variant manifest file request. Selection can be performed according to any of the embodiments described herein for improving network performance. The hostname of the selected manifest file server or cluster is included in the host field of the URL in the issued master manifest file.

For an issued variant manifest file, the host field of each URL can contain the hostname of a segment file server or cluster of system 200 or the hostname of a service provider server. In one embodiment, service provider manager 208 determines the URL type (i.e., whether the URL designates a segment file server/cluster or a service provider server) for each URL in the issued variant manifest file based on distribution policies, distribution models, and performance and utilization information received from performance administrator 214.

Distribution policies determine the allocation of URLs in a given variant manifest file among the possible URL types. For URLs that designate a service provider server, distribution policies also determine the allocation of such URLs among possible service providers. For example, a distribution policy can specify that 20% of the URLs designate a segment file server/cluster and 80% of the URLs designate a service provider server, and that 60% of the URLs designating a service provider designate a first service provider's server and 40% designate a second service provider's server.

Distribution models determine the pattern of distribution or ordering of URL types in a given variant manifest file. For example, a distribution model can specify that the first URL in the playback sequence designates a segment file server/cluster of system 200, followed by a specific number of URLs (such as 4) that designate service provider servers, followed by a URL that designates a segment file server/cluster of system 200, followed again by a specific number of URLs that designate service provider servers, and continuing in this fashion to alternate between URL types until the end of the playback sequence.

For URLs that designate a segment file server/cluster of system 200 in the issued variant manifest file, cluster performance manager 206 selects the segment file server/cluster for handling the video segment file request using a process similar to the selection of a manifest file server or cluster. For URLs that reference a service provider's server, service provider manager 208 selects a service provider for handling the video segment file request. In one embodiment, the service provider is selected based on distribution policies and performance information received from performance administrator 214.

Source manifest files 210 is a database or repository that stores source manifest files. Each issued manifest file is generated based on a source manifest file. When a request for a manifest file is received, the source manifest file can be identified based on the URL of the requested manifest file, which is included in the request. If an unexpired version of the source manifest file is not stored in source manifest files 210, manifest file server 204 can request the source manifest file from a server of the content provider or service provider.

Segment file server 212 further includes performance administrator 214 and video segment files 216. Video segment files 216 is a database or repository that stores video segment files. Segment file server 212 handles requests for video segment files. To process a request, segment file server 212 identifies a video segment file stored in video segment files 216 based on the URL that is included in the request. If an unexpired version of the video segment file is not stored in video segment files 210, segment file server 212 can request the video segment file from a server of the content provider or its service provider. In one embodiment, cluster performance manager 206 can transmit a notification to segment file server 212 when the issued variant manifest file is generated for a variant manifest file request. The notification informs segment file server 212 that it has been selected for the delivery of a video segment file in the issued variant manifest file. In response to receiving the notification, segment file server 212 can request the video segment file immediately if an unexpired version of the video segment file is not already available for it to serve. Thus, the video segment file can be requested from the content provider or service provider before the user device makes a request for the video segment file, or in any event before segment file server 212 receives the request sent by the user device. This can help reduce or eliminate delays in the processing of segment file requests for video segment files that need to be retrieved from the content provider or service provider. Similarly, when segment file server 212 receives a request for the first video segment file it will serve from a given issued manifest, it can determine the next video segment file it will serve from that given issued manifest and request that next video segment file immediately if an unexpired version of that video segment file is not available.

Performance administrator 214 records request attributes of segment file requests and transmission measurements of video segment file transmissions. Request attributes include information such as the video segment file requested, the encoding bitrate of the requested video segment file, the service provider(s) delivering the other segments of the video for the session, information (such as IP address or hostname) identifying the access network that the request was received from, the type of access network, and the device type, device model, and the user agent of the user device that made the request. Transmission measurements include the transmission rate at which the video segment file was transmitted to the user device, packet-level statistical measurements of transmission, the day and time of transmission, and the duration of transmission. Based on this data that is recorded for each session, performance statistics, trends and reports can be generated for a specific session, video, video category, content provider, service provider, access network, user agent, or user device type, just to list a few examples.

In other embodiments, cluster performance manager 206, service provider manager 208, and performance administrator 214 can be implemented on one or more physical servers separate from manifest file server 204 and segment file server 212. Source manifest files 210 and video segment files 216 can also be stored on one or more storage devices separate from manifest file server 204 and segment file server 212. For example, source manifest files 210 and video segment files 216 can be stored on a network attached storage (NAS) that is coupled to multiple manifest file servers/clusters and segment file servers/clusters.

Figure 3:
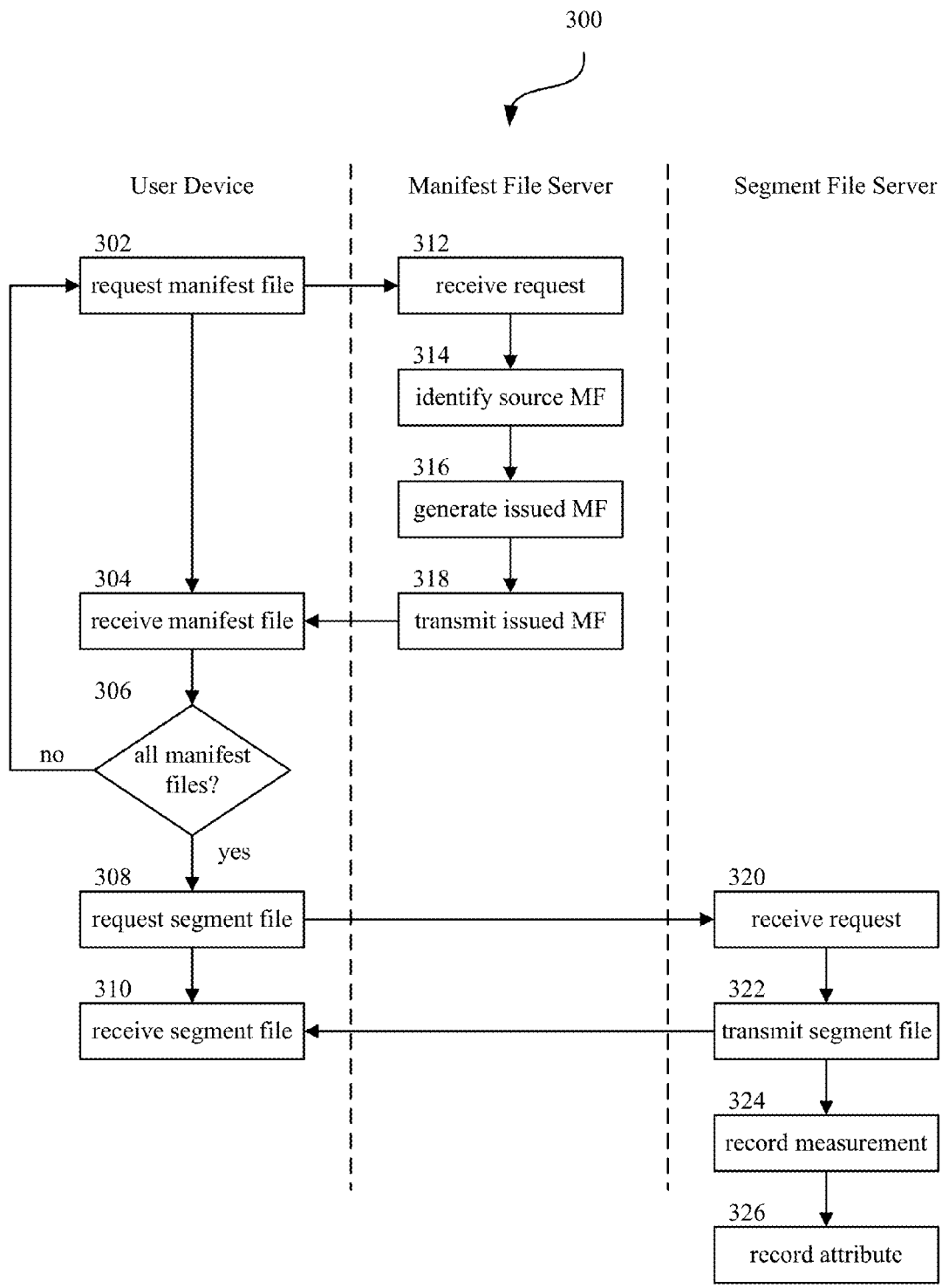
FIG. 3 is an interaction flowchart of one embodiment of a process for measuring and managing the performance of adaptive streaming video deliveries.

FIG. 3 is an interaction flowchart of one embodiment of a process 300 for measuring and managing the performance of adaptive streaming video deliveries. This flowchart illustrates the interactions between a user device, a manifest file server, and a segment file server. The user device communicates with the manifest file server and segment file server via a network, such as the internet.

At block 302, the user device makes a request for a manifest file, for example, using a URL that is published on a content provider webpage. At block 304, an issued manifest file is received by the user device from the manifest file server as a response to the request. At block 306, a branching decision is made based on whether all manifest files for the video have been received. If all necessary manifest files have not been received, process 300 returns to block 302 and blocks 302, 304, and 306 are repeated until all necessary manifest files have been received. Note that many user devices are functionally capable of making more than one concurrent data request; for these user devices, the number of repetitions through blocks 302, 304, and 306 will be reduced, including to a single sequence through blocks 302, 304, and 306 if the device is capable of making all necessary manifest file requests concurrently. Then, process 300 continues to block 308 wherein the user device makes a request for a video segment file using one of the URLs from one of the received variant manifest files. At block 310, the requested video segment file is received from the segment file server. Blocks 308 and 310 are repeated for each segment of the video that is served by a segment file server of system 100.

Turning now to the manifest file server, at block 312, the manifest file server receives the request for the manifest file. The request includes the URL that references the manifest file. For example, the URL can include a character string that identifies the content provider and the path of the URL can include an identifier of the manifest file. At block 314, a source manifest file is identified based on the URL included in the request. At block 316, an issued manifest file is generated based on the source manifest file. More details for generating an issued manifest file are provided herein below with reference to FIG. 4. At block 318, the issued manifest file is transmitted to the user device.

Turning now to the segment file server, at block 320, the segment file server receives the request for the video segment file. Based on the URL included in the request, a video segment file is identified and at block 322, the video segment file is transmitted to the user device. At block 324, a measurement of the transmission of the video segment file is recorded and at block 326, an attribute of the request for the video segment file is recorded.

Figure 4:
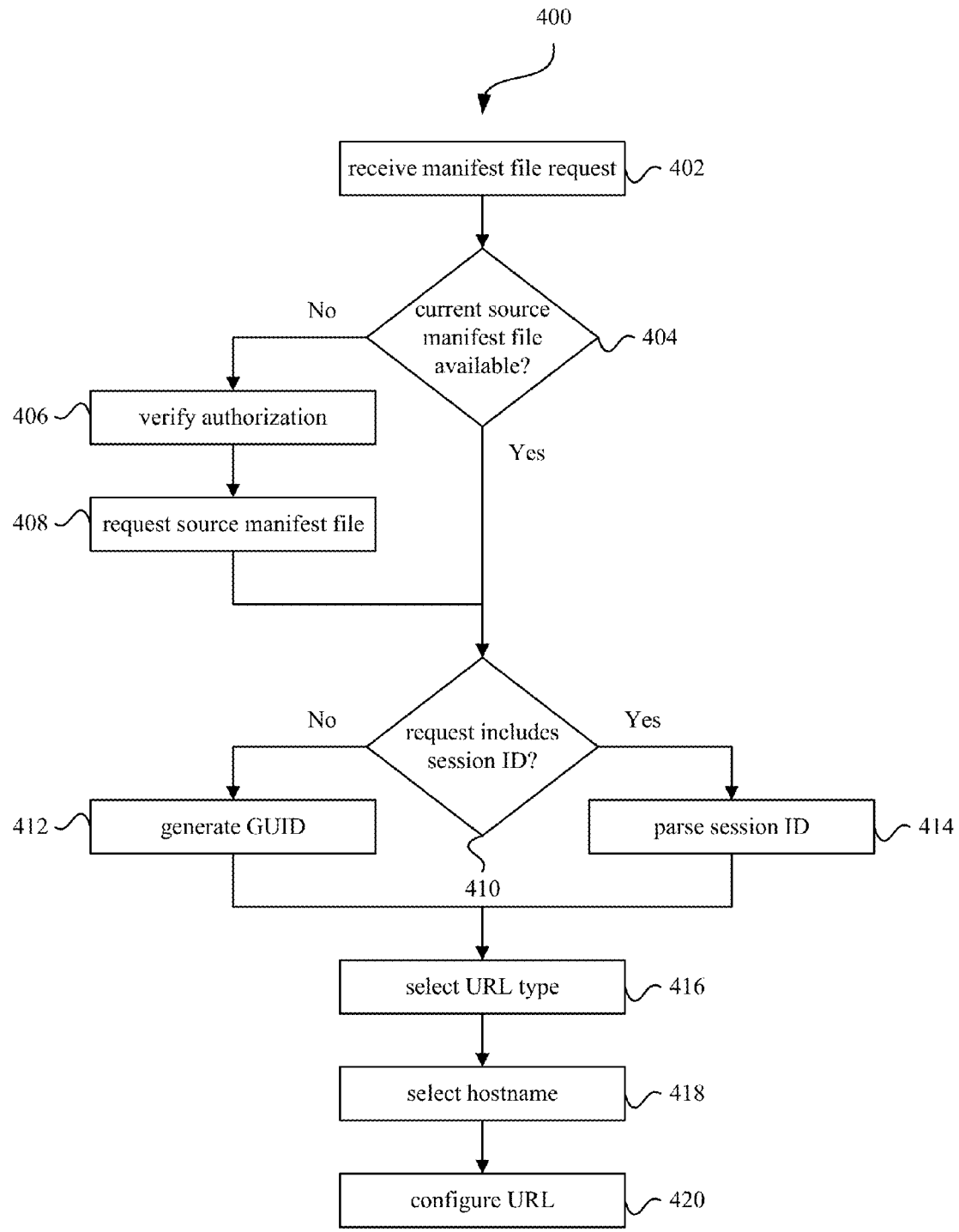
FIG. 4 is a flowchart of one embodiment of a process for generating an issued manifest file.

FIG. 4 is a flowchart of one embodiment of a process 400 for generating an issued manifest file. Process 400 can be performed, for example, by a manifest file server in conjunction with a cluster performance manager and a service provider manager. At block 402, a manifest file request is received and a source manifest file is identified based on the request. For example, the source manifest file can be identified based on the string of characters that designate the content provider and the manifest file name, which are both included in the URL that is received with the request. In one embodiment, the character string that designates the content provider and the manifest file name are parsed from the URL. The character string and the file name are then concatenated together and the source manifest file is identified using the concatenated string. At block 404, a decision is made based on whether a current version of the source manifest file is available. For example, a query can be made on the source manifest files repository using the concatenated string. If the current version of the source manifest file is available, the source manifest file can be retrieved from the repository and process 400 continues to block 410.

If the current version of the source manifest file is not available, process 400 continues to block 406 wherein the content provider is verified to be authorized to use the service. In one embodiment, a hostname authorities file is used to verify authorization. The hostname authorities file includes a hostname authority record for each authorized content provider. The hostname authorities file can be encrypted or similarly protected from tampering by unauthorized parties. Verification can be performed by searching for a hostname authority record in the hostname authorities file using the character string that designates the content provider. If a record is found, then authorization is verified.

At block 408, the source manifest file is requested from the content provider or a service provider. In one embodiment, a URL for the source manifest file is constructed using information included in the URL received with the request at block 402. For example, the character string designating the content provider can be used as the hostname in the URL for the source manifest file, or the character string can be used to look up the hostname of a service provider server in a hostname authority record. The path of the URL received with the request can be used as the path of the URL for the source manifest file. The constructed URL for the source manifest file is used to request the source manifest file. After the source manifest file is received, the source manifest file can be cached in the database for future requests. In one embodiment, when an initial request for a manifest file of a video is received, the entire set of source manifest files for the video is retrieved. The entire set of source manifest files includes all of the source manifest files that are available for the video.

At block 410, a decision is made based on whether the URL received with the request includes a session identifier (ID). If this is an initial request for the master manifest file of the video content that is made using a URL published on a content provider website, then the URL does not include a session ID. In this case, process 400 continues to block 412 wherein a globally unique identifier (GUID) is generated and assigned as the session ID for the current video streaming session. If it is not an initial request for the video content (i.e., if the request is for a variant manifest file), the URL includes a session ID because, in this embodiment, the session ID is inserted into variant manifest URLs contained within issued master manifest files. For example, the session ID can be included in the host field of the URL, in the path portion of the URL, or appended at the end of the URL as a query string. If the URL includes the session ID, the session ID is parsed from the URL at block 414.

At block 416, a URL type is selected for a URL that is included in the issued manifest file generated for this request. Block 416 is only performed for variant manifest file requests because all of the URLs in an issued master manifest file will reference manifest file servers implemented according to embodiments described herein, not service provider servers. At block 418, a hostname is selected for the host field of the URL based on the URL type. For example, if the URL type is a service provider URL, a hostname of a service provider server is selected. At block 420, the URL is configured based on the selected URL type and the selected hostname. The URL is also conditionally configured to include the session ID, depending on the URL type and potentially depending on other conditions. For example, for URLs that contain a hostname associated with segment file servers of the system 100, the session ID is included in the URL; for URLs that contain a hostname associated with a service provider whose segment file servers can perform block 324 and/or block 326 (recording measurements and/or attributes), a session ID is included in the URL; and for URLs that contain a hostname associated with a service provider that is not capable of handling the session ID, the session ID is not included in the URL. Blocks 416-420 are repeated for each URL included in the issued manifest file. For example, if the request is for a variant manifest file of a video that has ten segments, then block 416-420 are repeated ten times to configure ten URLs, one for each segment. After all of the URLs have been configured, the issued manifest file is transmitted to the user device to complete the request.

FIG. 5 is an illustration of exemplary issued variant manifest files that are generated for an adaptive streaming video. This figure illustrates a first issued variant manifest file 500 and a second issued variant manifest file 550. First issued variant manifest file 500 includes URLs that reference video segment files encoded at 200 kbps for the adaptive streaming video and second issued variant manifest file 550 includes URLs that reference video segment files encoded at 600 kbps. There are twelve segments for this video, thus there are twelve URLs in each issued variant manifest file. The URLs are ordered according to the video segment number of the video segment file that is referenced by each URL. Thus, the URL that references the video segment file corresponding to the first segment of the video is the first URL in each issued variant manifest file, and the URL that references the video segment file corresponding to the last segment of the video is the last URL in each issued variant manifest file.

First issued variant manifest file 500 includes URLs 502-524. In this embodiment, the first URL 502, the fifth URL 510, the ninth URL 518, and the last URL 524 designate a segment file server or cluster implemented according to the embodiments described herein for the delivery of the respective video segment files. The hostname that is contained in the host field of these URLs 502, 510, 518, and 524 is sfs.b.manifestserver.net, which, for example, designates cluster B of segment file servers (sfs.b) within the second-level domain manifestserver.net. In other embodiments, different segment file servers or clusters can be used for the URLs within a single issued variant manifest file. For example, the first URL 502 can designate cluster B of segment file servers while the fifth URL 510 can designate cluster A or a specific segment file server. The path portion of the URLs 502, 510, 518, and 524 includes the session ID XYZ789, the character string contentprovider, which designates the content provider for the request video, and the path of the respective video segment file.

The other URLs 504-508, 512-516, and 520-522 in first issued variant manifest file 500 designate service provider servers for the delivery of the respective video segment files. The host field contains the hostname contentprovider.service-provider.net, which designates the subdomain contentprovider within the second level domain service-provider.net. In this embodiment, all of the URLs 504-508, 512-516, and 520-522 designate the same second level domain, which is a hostname that is associated with a service provider server; in another issued manifest that references another playback of the same video (for example, to a second user viewing the video), the URLs 504-508, 512-516, and 520-522 can designate a different second level domain, which is a hostname that is associated with a server of a second service provider, in order to allocate the distribution of the video among a number of service providers, for example, according to a distribution policy. In other embodiments, some of URLs 504-508, 512-516, and 520-522 can designate one service provider while other URLs of URLs 504-508, 512-516, and 520-522 can designate a second service provider to allocate the distribution of the video among a number of service providers, for example, according to a distribution policy or model. The number of service provider URLs between each pair of segment file server URLs, which in this case is three, can also be determined according to the distribution policy or model to implement a percentage of distribution, and frequency of segment files served, that will be handled by the segment file servers. The path portion of the URLs 504-508, 512-516, and 520-522 includes the path of the respective video segment file. In this embodiment, the session ID is not included in the service provider URLs 504-508, 512-516, and 520-522. In other embodiments where the service provider supports session IDs and logging/reporting measurements, the service provider URLs 504-508, 512-516, and 520-522 can also include the session ID, for example, in the host field, in the path portion, or appended as a query string.

Second issued manifest file 550 includes URLs 552-574. In this embodiment, the positioning of URLs that designate a segment file server and URLs that designate a service provider server is consistent between first issued variant manifest file 500 and second issued manifest file 550. Thus, URLs 552, 560, 568, and 574 designate a segment file server and URLs 554-558, 562-566, and 570-572 designate a service provider server. In addition to using consistent positioning of URL types across issued variant manifest files for different encoding bitrates, consistent positioning can also be used across issued variant manifest files for different sessions and different videos. The advantages of having consistent positioning of URL types include less storage capacity requirements on segment file servers since the segment file servers do not have to store the segments that are not delivered by segment file servers. In other embodiments, random positioning of URL types can be used across some or all of the video segments, which enables the segment file servers to record delivery measurements with finer granularity across video segments.

There are also advantages to having the first URL and/or the last URL designate segment file servers. By designating a segment file server in the first URL, it can be ensured that the first segment of the video is delivered to the user at the fastest transmission rate possible through the user's access network. Thus, any subsequent downshift in encoding bitrate can be correlated with the network performance of the service provider that is delivering the other segments of the video. By designating a segment file server in the last URL, the segment file server can record measurements regarding the number and percentage of users that request and complete downloading the last segment of the video, and therefore watched the entire video.

In some embodiments, dynamic adjustments can be made to the number of segment file server URLs in an issued variant manifest file based on the network performance of the segment file servers. For example, if the network traffic becomes congested or network performance degrades on the segment file server network, fewer segment file server URLs can be included in the issued variant manifest files to ensure user experience is not impacted due to delivery of the video segment files by the segment file servers. In this situation, all manifest files can be configured with fewer segment file URLs; alternatively, some manifest files may be configured with the standard number of segment file server URLs and some manifest files configured with a reduced number of segment file URLs and a higher number of service provider server URLs, thus reducing overall demand on segment file servers while still preserving the standard frequency of measurements in some of the video playback sessions. In extreme conditions, issued manifest files can be dynamically adjusted such that all URLs in some or all issued manifest files designate service provider servers, to ensure availability of the video content to users.

Figure 6:
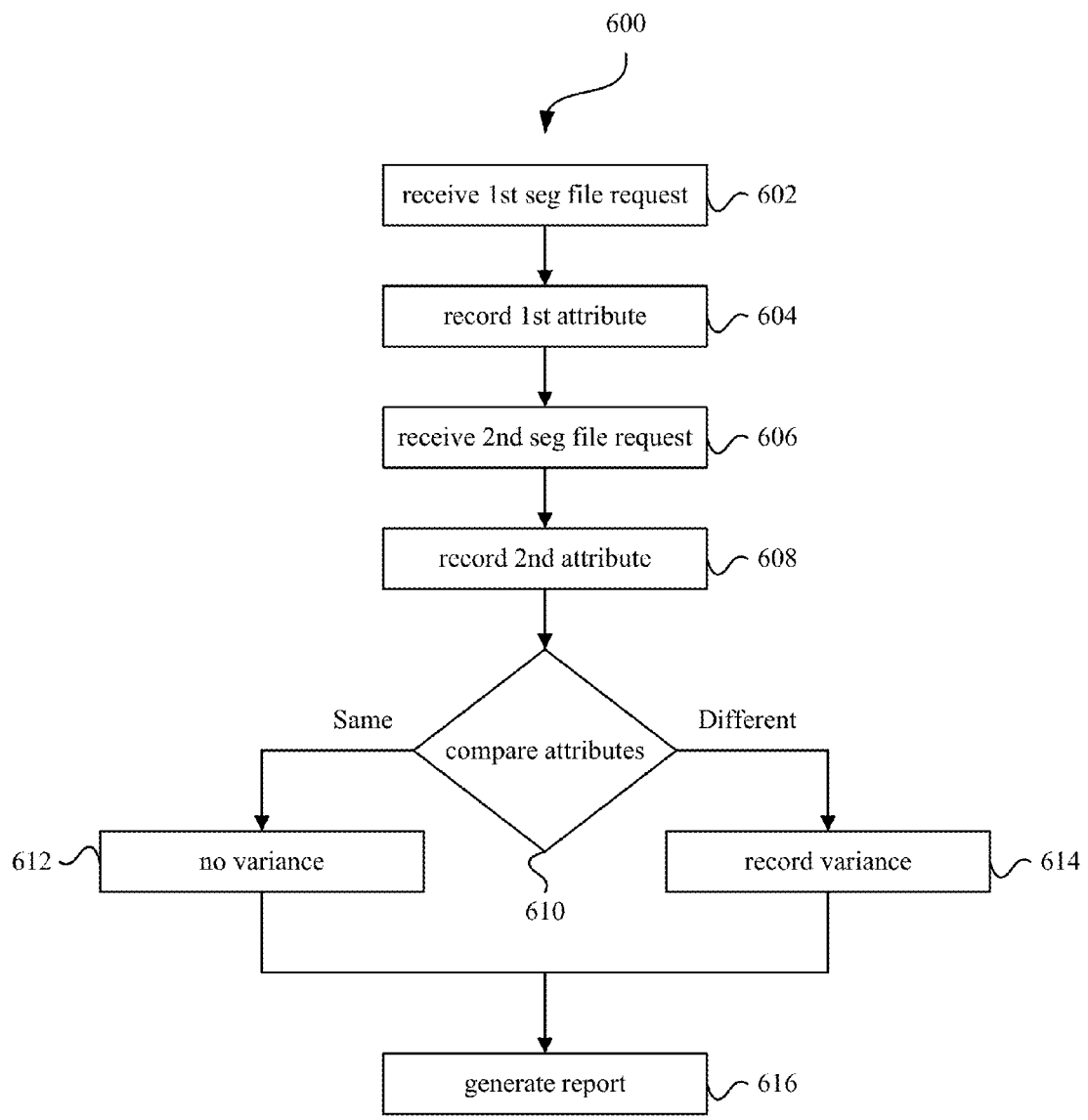
FIG. 6 is a flowchart of one embodiment of a process for measuring the performance of adaptive streaming video deliveries.

FIG. 6 is a flowchart of one embodiment of a process 600 for measuring the performance of adaptive streaming video deliveries. Process 600 can be performed, for example, by a segment file server in conjunction with a performance administrator.

At block 602, a first segment file request for a video segment file is received. A URL that references the video segment file is received with the request. The URL includes a character string designating the content provider, a session ID, and a path that identifies the requested video segment file, which can also include, or be associated with, the encoding bitrate of the video segment file. The request can also include additional information, such as data identifying the access network of the user device that transmitted the request (e.g., an IP address of the access network), the access network type, the user agent that transmitted the request, and any other information that is transmitted with URL requests. The segment file server, or another network component such as a switch, router, or data collection component, can determine additional information associated with the request, such as the time that the first data packet of the request is received, the time that any other data packet of the request is received, the time that delivery of the requested segment file is completed, packet loss and variations in packet transmissions associated with the request for, and delivery of, the requested segment file. At block 604, an attribute of the first segment file request is recorded. The recorded attribute can include any of the information that is received with the request, including information in the URL or the request message, or can include additional information, determined by the segment file server or another network component, associated with the request for, or delivery of, the requested segment file delivery. The session ID is recorded with the attributes. In one embodiment, the attributes are recorded in a database that is indexed by the session ID.

At block 606, a second segment file request is received for the same video viewing session. Thus, the second segment file request includes the same session ID as the first segment file request. At block 608, an attribute of the second segment file request is recorded with the session ID. At block 610, the recorded attribute of the first segment file request is compared to the recorded attribute of the second segment file request. If the attribute of the first request is the same as the attribute of the second request, process 600 continues to block 612 and variance is not recorded for this session. If the attribute of the first request is different than the attribute of the second request, a variance is recorded for the session at block 614. At block 616, a report is generated for the number or percentage of sessions that a variance is recorded for. The report can be generated periodically, for example monthly or quarterly, for viewing sessions during the period. The report can also be generated with specified parameters, such as for a specific service provider.

In this embodiment, the recorded attribute is the encoding bitrate of the request video segment file. Thus, by comparing the encoding bitrate of the first requested video segment file with the encoding bitrate of the second requested video segment file, it can be determined if there is a variance in the video quality during the viewing session, for example, due to network congestion, which could be noticed by the user. The report indicates the number or percentage of times a variance occurred during playback of the video for a certain period of time. This type of data can be desirable to content providers, for example, for quality control purposes.

In other embodiments, other attributes of the requests or measurements of the delivery of the video segment files can be recorded and used for different purposes. The recorded data can be aggregated for a given period by any of the following parameters: session, video, video mode, video category, geographical region, content provider, service provider, and user access network. Then, based on the aggregated data, performance statistics and reports can be generated for the given period and the given parameters. For example, statistics and reports can be generated for the average encoding bitrate used during playback, the number of requests for each video segment file, and the average progress through video playback or average stopping point of video playback.

The recorded data can also be used to manage content delivery among multiple service providers for optimal network performance and user experience. Recorded attributes and measurements can be analyzed in real-time or periodically to determine network performance for a combination of parameters. For example, network performance can be determined for different combinations of service providers and user access networks. Then, when a request for a variant manifest file is received, the URLs in the issued variant manifest file can be configured based on the analysis to designate the service provider that has the best network performance for the access network that the request was received from.

Figure 7:
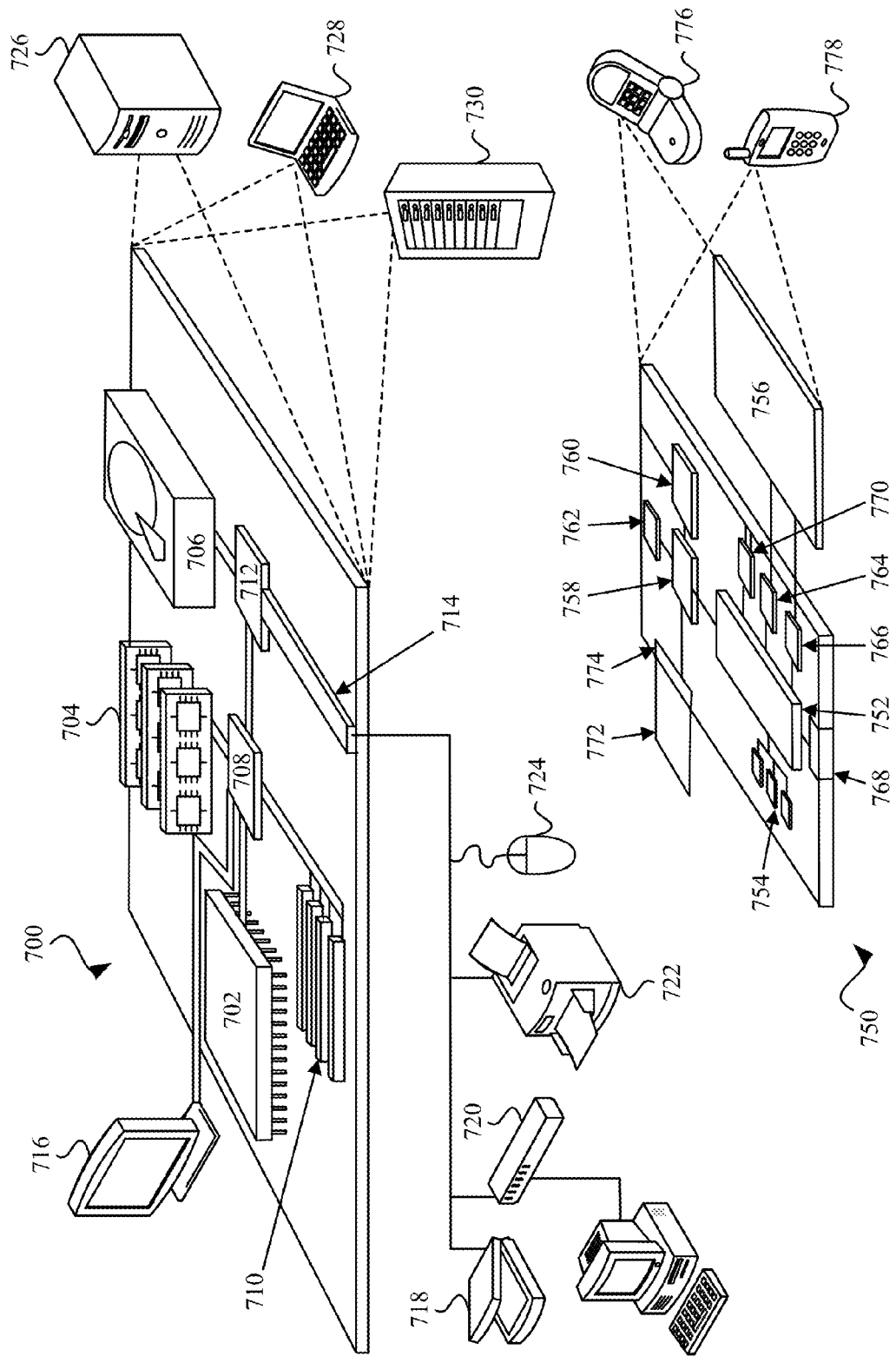
FIG. 7 is an illustration of embodiments of a special-purpose computer system and a computing device that can be used to implement a system for measuring and managing the performance of adaptive streaming video deliveries.

FIG. 7 is an illustration of embodiments of a special-purpose computer system 700 and a computing device 750 that can be used to implement a system for measuring and managing the performance of adaptive streaming video deliveries. Special-purpose computer system 700 represents various forms of digital computers, such as laptops, desktops, workstations, personal digital assistants, servers, blade servers, mainframes, and other appropriate computers. Computing device 750 represents various forms of mobile devices, such as personal digital assistants, cellular telephones, smart phones, tablets, laptops and other similar computing devices.

Computer system 700 includes a processor 702, random access memory (RAM) 704, a storage device 706, a high speed controller 708 connecting to RAM 704 and high speed expansion ports 710, and a low speed controller 712 connecting to storage device 706 and low speed expansion port 714. The components 702, 704, 706, 708, 710, 712, and 714 are interconnected using various busses, and may be mounted on a common motherboard or in other manners as appropriate. Computer system 700 can further include a number of peripheral devices, such as display 716 coupled to high speed controller 708. Additional peripheral devices can be coupled to low speed expansion port 714 and can include an optical scanner 718, a network interface 720 for networking with other computers, a printer 722, and input device 724 which can be, for example, a mouse, keyboard, track ball, or touch screen.

Processor 702 processes instructions for execution, including instructions stored in RAM 704 or on storage device 706. In other implementations, multiple processors and/or multiple busses may be used, as appropriate, along with multiple memories and types of memory. RAM 704 and storage device 706 are examples of non-transitory computer-readable media configured to store data such as a computer program product containing instructions that, when executed, cause processor 702 to perform methods and processes according to the embodiments described herein. RAM 704 and storage device 706 can be implemented as a floppy disk device, a hard disk device, an optical disk device, a tape device, a flash memory or other similar solid-state memory device, or an array of devices, including devices in a storage area network or other configurations.

High speed controller 708 manages bandwidth-intensive operations for computer system 700, while low speed controller 712 manages lower bandwidth-intensive operations. Such allocation of duties is exemplary only. In one embodiment, high speed controller 708 is coupled to memory 704, display 716 (e.g., through a graphics processor or accelerator), and to high speed expansion ports 710, which can accept various expansion cards (not shown). In the embodiment, low speed controller 712 is coupled to storage device 706 and low speed expansion port 714. Low speed expansion port 714 can include various communication ports or network interfaces, such as universal serial bus (USB), Bluetooth, Ethernet, and wireless Ethernet.

Computer system 700 can be implemented in a number of different forms. For example, it can be implemented as a standard server 726, or multiple servers in a cluster. It can also be implemented as a personal computer 728 or as part of a rack server system 730. Alternatively, components from computer system 700 can be combined with other components in a mobile device (not shown), such as device 750. Each of such devices can contain one or more of computer system 700 or computing device 750, and an entire system can be made up of multiple computer systems 700 and computing devices 750 communicating with each other.

Computing device 750 includes a processor 752, memory 754, an input/output device such as a display 756, a communication interface 758, and a transceiver 760, among other components. The components 752, 754, 756, 758, and 760 are interconnected using various busses, and several of the components may be mounted on a common motherboard or in other manners as appropriate. Computing device 750 can also include one or more sensors, such as GPS or A-GPS receiver module 762, gyroscopes (not shown), and cameras (not shown), configured to detect or sense motion or position of computing device 750.

Processor 752 can communicate with a user through control interface 764 and display interface 766 coupled to display 756. Display 756 can be, for example, a thin-film transistor (TFT) liquid-crystal display (LCD), an organic light-emitting diode (OLED) display, or other appropriate display technology. Display interface 766 can comprise appropriate circuitry for driving display 756 to present graphical and other information to the user. Control interface 764 can receive commands from the user and convert the commands for submission to processor 752. In addition, an external interface 768 can be in communication with processor 752 to provide near area communication with other devices. External interface 768 can be, for example, a wired communication interface, such as a dock or USB, or a wireless communication interface, such as Bluetooth or near field communication (NFC).

Device 750 can also communicate audibly with the user through audio codec 770, which can receive spoken information and convert it to digital data that can be processed by processor 752. Audio codec 770 can likewise generate audible sound for the user, such as through a speaker. Such sound can include sound from voice telephone calls, recorded sound (e.g., voice messages, music files, etc.), and sound generated by applications operating on device 750.

Expansion memory 772 can be connected to device 750 through expansion interface 774. Expansion memory 772 can provide extra storage space for device 750, which can be used to store applications or other information for device 750. Specifically, expansion memory 772 can include instructions to carry out or supplement the processes described herein. Expansion memory 772 can also be used to store secure information.

Computing device 750 can be implemented in a number of different forms. For example, it can be implemented as a cellular telephone 776, smart phone 778, personal digital assistant, tablet, laptop, or other similar mobile device.

It is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for providing an interspersed manifest file specification for an adaptive streaming video, the system comprising:
   a processing unit including one or more processors; and
   memory coupled with and readable by the processing unit and storing therein a set of instructions, wherein the execution of the one or more sets of instructions by the one or more processing units, causes the system to:
   receive, from a requesting device, a request for data relating to an interspersed manifest file to be created for an adaptive streaming video, wherein the adaptive streaming video is encoded at a plurality of reference bitrates, and wherein a plurality of video segment files corresponding to the adaptive streaming video is stored for each of the plurality of reference bitrates;
   determine an interspersing pattern of universal resource locators (URLs) for the interspersed manifest file, wherein the interspersing pattern of URLs specifies that a first subset of URLs corresponding to a first subset of video segment files hosted by a first domain, are to be interspersed among a second subset of URLs corresponding to a second subset of video segment files hosted by a second domain; and
   transmit, to the requesting device in response to the request, data identifying the interspersing pattern of URLs for the interspersed manifest file to be created for the adaptive streaming video, and data identifying the second domain configured to serve the second subset of video segment files.

2. The system of claim 1, the memory storing therein additional instructions that, when executed by the one or more processing units, cause the system to:
   identify one or more attributes associated with a user device, wherein the user device is associated with the request received from the requesting device;
   determine, based on one or more of the attributes associated with the user device, a subset of the plurality of reference bitrates to be used for serving the plurality of video segment files corresponding to the adaptive streaming video; and
   transmit, to the requesting device in response to the request, data identifying the determined subset of the plurality of reference bitrates.

3. The system of claim 2, wherein the identified attributes associated with the user device include an access network associated with the user device.

4. The system of claim 2, wherein the identified attributes associated with the user device include a device type of the user device.

5. The system of claim 1, wherein the determined interspersing pattern of URLs for the interspersed manifest file to be created comprises a repeating pattern of a single URL from the first subset of URLs hosted by the first domain, followed by a plurality of URLs from the second subset of URLs hosted by the second domain.

6. The system of claim 1, the memory storing therein additional instructions that, when executed by the one or more processing units, cause the system to:
   select the second domain from a plurality of domains associated with a plurality of infrastructure services, based on a distribution policy, the distribution policy defining a load allocation among the plurality of infrastructure services.

7. The system of claim 1, wherein the system additionally comprises one or more segment file servers, and wherein the memory stores additional instructions that, when executed by the one or more processing units, cause the system to:
   receive, at the one or more segment file servers, a plurality of requests for video segment files from a user device executing the interspersed manifest file, wherein the plurality of received requests includes requests for the first subset of video segment files and does not include requests for the second subset of video segment files; and
   serve, via the one or more segment file servers, one or more of the first subset of video segment files to the user device in response to the plurality of requests.

8. A method of providing an interspersed manifest file specification for an adaptive streaming video, the method comprising:
   receiving, from a requesting device, a request for data relating to an interspersed manifest file to be created for an adaptive streaming video, wherein the adaptive streaming video is encoded at a plurality of reference bitrates, and wherein a plurality of video segment files corresponding to the adaptive streaming video is stored for each of the plurality of reference bitrates;
   determining an interspersing pattern of universal resource locators (URLs) for the interspersed manifest file, wherein the interspersing pattern of URLs specifies that a first subset of URLs corresponding to a first subset of video segment files hosted by a first domain, are to be interspersed among a second subset of URLs corresponding to a second subset of video segment files hosted by a second domain; and
   transmitting, to the requesting device in response to the request, data identifying the interspersing pattern of URLs for the interspersed manifest file to be created for the adaptive streaming video, and data identifying the second domain configured to serve the second subset of video segment files.

9. The method of claim 8, further comprising:
   identifying one or more attributes associated with a user device, wherein the user device is associated with the request received from the requesting device;
   determining, based on one or more of the attributes associated with the user device, a subset of the plurality of reference bitrates to be used for serving the plurality of video segment files corresponding to the adaptive streaming video; and
   transmitting, to the requesting device in response to the request, data identifying the determined subset of the plurality of reference bitrates.

10. The method of claim 9, wherein the identified attributes associated with the user device include an access network associated with the user device.

11. The method of claim 9, wherein the identified attributes associated with the user device include a device type of the user device.

12. The method of claim 8, wherein the determined interspersing pattern of URLs for the interspersed manifest file to be created comprises a repeating pattern of a single URL from the first subset of URLs hosted by the first domain, followed by a plurality of URLs from the second subset of URLs hosted by the second domain.

13. The method of claim 8, further comprising:
selecting the second domain from a plurality of domains associated with a plurality of infrastructure services, based on a distribution policy, the distribution policy defining a load allocation among the plurality of infrastructure services.

14. The method of claim 8, further comprising:
receiving a plurality of requests for video segment files from a user device executing the interspersed manifest file, wherein the plurality of received requests includes requests for the first subset of video segment files and does not include requests for the second subset of video segment files; and
serving one or more of the first subset of video segment files to the user device in response to the plurality of requests.

15. A system for providing an interspersed manifest file specification for an adaptive streaming video, the system comprising:
a processing unit including one or more processors; and
memory coupled with and readable by the processing unit and storing therein a set of instructions, wherein the execution of the one or more sets of instructions by the one or more processing units, causes the system to:
receive, from a requesting device, a request for data relating to an interspersed manifest file to be created for an adaptive streaming video, wherein the adaptive streaming video is encoded at a plurality of reference bitrates, and wherein a plurality of video segment files corresponding to the adaptive streaming video is stored for each of the plurality of reference bitrates;
determine a second domain configured to serve a second subset of video segment files corresponding to a second subset of URLs, wherein the interspersed manifest file to be created includes a first subset of URLs hosted by a first domain which are interspersed among the second subset of URLs hosted by the second domain; and
transmit, to the requesting device in response to the request, data identifying the second domain configured to serve the second subset of video segment files.

16. The system of claim 15, the memory storing therein additional instructions that, when executed by the one or more processing units, cause the system to:
identify one or more attributes associated with a user device, wherein the user device is associated with the request received from the requesting device;
determine, based on one or more of the attributes associated with the user device, a subset of the plurality of reference bitrates to be used for serving the plurality of video segment files corresponding to the adaptive streaming video; and
transmit, to the requesting device in response to the request, data identifying the determined subset of the plurality of reference bitrates.

17. The system of claim 16, wherein the identified attributes associated with the user device include an access network associated with the user device.

18. The system of claim 16, wherein the identified attributes associated with the user device include a device type of the user device.

19. The system of claim 15, wherein determining the second domain comprises selecting the second domain from a plurality of domains associated with a plurality of infrastructure services, based on a distribution policy, the distribution policy defining a load allocation among the plurality of infrastructure services.

20. The system of claim 15, wherein the system additionally comprises one or more segment file servers, and wherein the memory stores additional instructions that, when executed by the one or more processing units, cause the system to:
receive, at the one or more segment file servers, a plurality of requests for video segment files from a user device executing the interspersed manifest file, wherein the plurality of received requests includes requests for the first subset of video segment files and does not include requests for the second subset of video segment files; and
serve, via the one or more segment file servers, one or more of the first subset of video segment files to the user device in response to the plurality of requests.

* * * * *